United States Patent

Sperl et al.

[11] Patent Number: 5,250,483
[45] Date of Patent: Oct. 5, 1993

[54] METHOD FOR TREATMENT OF CATALYSTS USING DENITRIFYING BACTERIA

[75] Inventors: George T. Sperl; Donald O. Hitzman, both of Bartlesville, Okla.

[73] Assignee: Geo-Microbial Technologies, Inc., Ochelata, Okla.

[21] Appl. No.: 887,011

[22] Filed: May 22, 1992

[51] Int. Cl.$^5$ .......................... B01J 37/36; B01J 29/38; C01G 39/00; C01G 51/00
[52] U.S. Cl. ................................ 502/7; 423/53; 423/54; 423/68; 423/87; 423/98; 423/150.1; 423/DIG. 17; 435/262; 435/874; 502/12; 502/20; 502/26; 502/29; 502/33
[58] Field of Search ............... 502/7, 20, 26, 29, 516, 502/12, 33; 423/DIG. 17

[56] References Cited

U.S. PATENT DOCUMENTS

| | | | |
|---|---|---|---|
| 3,197,416 | 7/1965 | Bergman et al. | 502/516 |
| 3,272,621 | 9/1966 | Zajic | 423/DIG. 17 |
| 3,414,524 | 12/1968 | Absoh et al. | 502/7 |
| 4,559,313 | 12/1985 | Myerson et al. | 502/25 |

*Primary Examiner*—Paul E. Konopka
*Attorney, Agent, or Firm*—Foley & Lardner

[57] ABSTRACT

A method of releasing metals from catalysts in a form that is readily recoverable using denitrifying bacteria is disclosed. The method can be used to regenerate catalysts and to recover metals from catalysts, especially molybdenum and nickel.

10 Claims, 3 Drawing Sheets

METHOD FOR TREATMENT OF CATALYSTS USING DENITRIFYING BACTERIA

BACKGROUND OF THE INVENTION

The present invention relates to a method of releasing metals from catalysts using dentrifying bacteria. It relates in particular to the regeneration of spent catalysts and to the recovery of metals from catalysts, especially molybdenum and nickel.

Catalysts are used in a variety of hydrocarbon treatment and conversion processes, such as in the cracking of petroleum residues and in the processing of other chemicals. During use of the catalyst, metal sulfides, metal oxides and organometallic compounds are deposited on the surface and in the pores of the catalysts, causing a loss of catalytic activity and selectivity. This leads to poor product distribution and otherwise reduces the effectiveness of the catalyst. This is particularly so when crude oils containing high amounts of certain metals are to be processed.

Attempts have been made to identify bacteria having the ability to regenerate spent catalysts contaminated with metals. U.S. Pat. No. 3,414,524 describes a method of activating or reactivating inactive catalytic material using sulfate-reducing, sulfate-oxidizing and iron oxidizing bacterial strains. The method is particularly used to reactivate catalysts poisoned by exposure to sulfur.

U.S. Pat. No. 4,559,313 relates to the removal from catalyst of inorganic contaminants, particularly vanadium and nickel. The method uses an oxidizing, i.e., aerobic, species of bacteria. Suitable bacteria are selected from the group consisting of *Ferrobaccillus ferrooxidans, Thiobacillus ferrooxidans,* (now considered to be the same organism), *Thiobacillus thiooxidans,* and *Sulfolobous acidolphus,* with *Thiobacillus ferroxidans* being particularly preferred. This latter bacterium, however, is impractical for industrial applications. Because these bacteria are very sensitive to tungstate and molybdate, the process requires unacceptably large volumes and is very slow. The other species mentioned in U.S. Pat. No. 4,559,313 do not effectively remove metals from spent catalyst. In addition, all of the species disclosed require oxygen for metabolism.

SUMMARY OF THE INVENTION

It is therefore and object of the present invention to provide an improved process for the treatment of catalysts.

It is a further object of the invention to provide a method for regeneration of spent catalysts contaminated by nickel, cobalt, molybdenum, vanadium, antimony, tungsten and other metal sulfides.

It is yet another object of the invention to provide a method for regeneration of spent catalysts contaminated by nickel, vanadium and antimony.

It is another object of the invention to release metals from catalysts.

It is a further object of the invention to recover metals from catalysts.

It is another object of the invention to recover nickel, cobalt, molybdenum, vanadium, antimony and/or tungsten from catalysts.

These and other objects according to the invention are provided by a method for treatment of catalyst, comprising the step of treating the catalyst with a solution containing heterotrophic, denitrifying bacteria to release metals associated with the catalyst. The metals associated with a catalyst are metals that have contaminated the catalyst during use or are metals that are an active part of the catalyst. The solution containing the heterotrophic, denitrifying bacteria is preferably a sulfur-free culture medium. In a preferred embodiment, the step of treating the catalyst with a solution containing heterotrophic, denitrifying bacteria occurs in an anaerobic environment, preferably a leach pile. The pH during the step of treating the catalyst with a solution containing heterotrophic, denitrifying bacteria is preferably between about 6.5 and 7.5.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
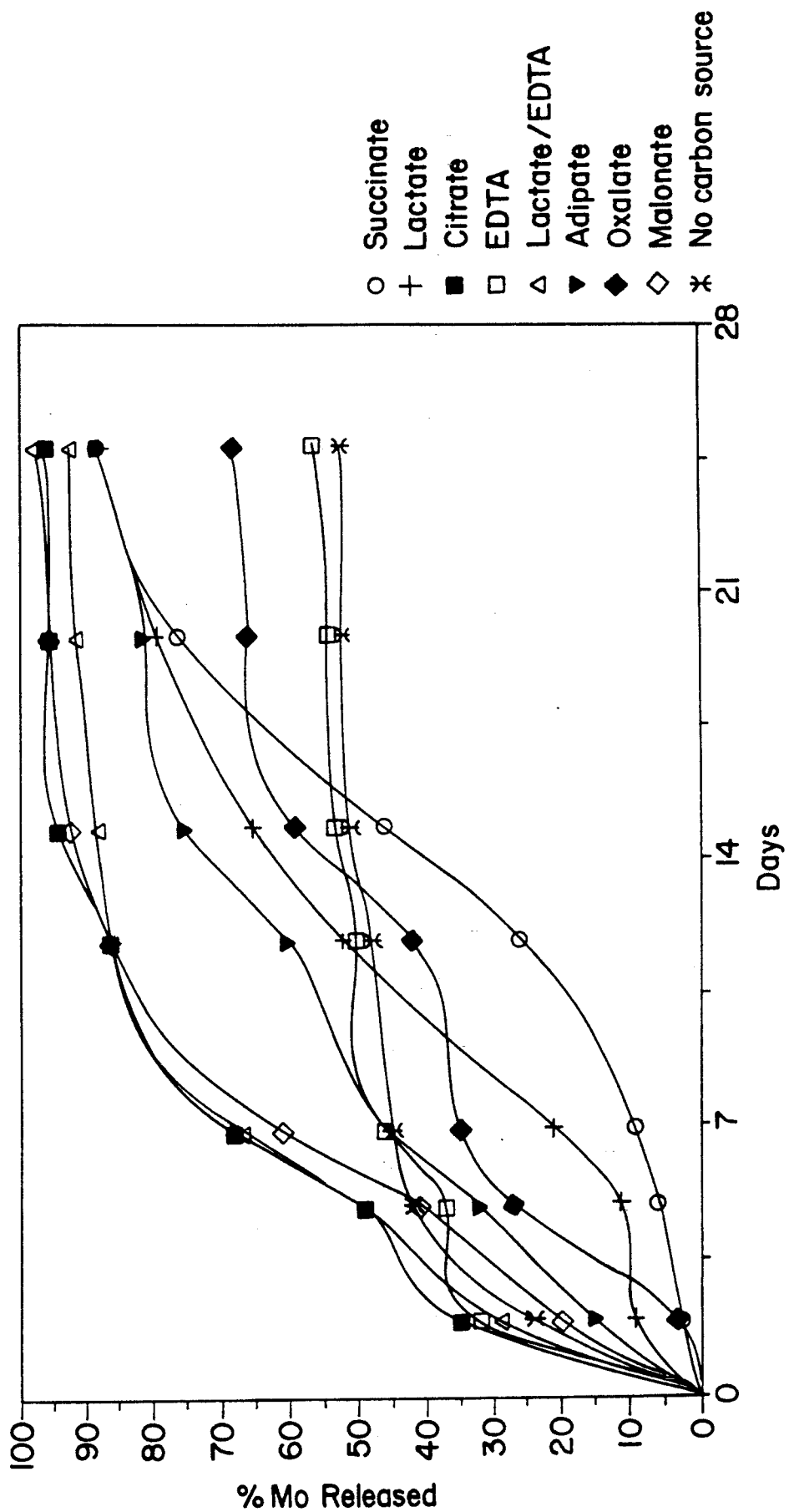
FIG. 1 is a plot of the percentage of molybdenum released by a solution of denitrifying bacteria according to the present invention as a function of time. The effect of the carbon source present in the growth medium for the denitrifying bacteria on the release of molybdenum is shown.

It has surprisingly been discovered according to the present invention that the heterotrophic, denitrifying bacteria are highly effective in the treatment of catalysts in order to release metals associated with the catalysts. Denitrifying bacteria have never been suggested to have any activity in a process for catalyst treatment. To the contrary, the ability of this class of bacteria to release metals from catalysts was hitherto unsuspected in the art and appears to be widespread among members of the class.

Members of the class of heterotrophic, denitrifying bacteria can be found almost everywhere. Strains useful in the present invention have been found in soil, anaerobic digestors, the ocean and municipal water systems. A preferred source for isolation of denitrifying bacteria according to the present invention is the soil and water associated with oil fields.

The heterotrophic, denitrifying bacteria are identified as such by growth on a medium that is selective for dissimilatory nitrate reduction, i.e., for denitrification. Mixed cultures of denitrifying bacteria identified in this way need not be further purified or characterized for use in the process according to the invention. However, further characterization typically results in identification of about 75% of the population as members of the genus Pseudomonas, with the remainder of the population representing a variety of genera, including Bacillus.

The heterotrophic, denitrifying bacteria according to the invention can use inorganic sulfur as a source of nutritional sulfur. In particular, these bacteria can solubilize FeS and use both the sulfur and the iron obtained thereby for nutrition. Unexpectedly, these bacteria also appear to act on sulfides of other metals, notably molybdenum sulfide and nickel sulfide, thereby to release soluble metal into solution in a readily recoverable form.

The culture medium for the bacteria according to the invention supplies nitrate as the terminal electron acceptor and simple, typically non-fermentable, carbon compounds as a source of carbon and energy. The bacteria are grown in an anaerobic environment. Under these conditions, only organisms capable of coupling the oxidation of the simple organic sources supplied to the reduction of nitrate to nitrogen gas will grow.

A suitable medium for culture of the denitrifying bacteria is Medium 337 of Hirsch and Conti, the composition of which is as follows:

| Medium 337 | |
|---|---|
| Ingredient | g/l |
| $KH_2PO_4$ | 1.4 |
| $Na_2HPO_4$ | 2.1 |
| $MgCl_2.6H_2O$ | 0.2 |
| $CaCl_2.2H_2O$ | .01 |
| $NH_4NO_3$ | 10.0 |
| SL-4 Trace metals (see below) | 1 ml |
| $Na_2SO_4$ (if necessary) | 0.5 |
| Carbon source, 0.5% (w/v) | 5.0 |
| Final pH = 6.8 | |

| SL-4 Trace Metals | |
|---|---|
| Ingredient | mg/l |
| $FeCl_2.5H_2O$ | 100 |
| $MnCl_2.4H_2O$ | 25 |
| $CuCl_2.2H_2O$ | 10 |
| $CoCl_2.6H_2O$ | 20 |
| $NiCl_2.6H_2O$ | 20 |
| $Na_2MoO_4.2H_2O$ | 30 |
| $Na_2SeO_3$ | 5 |
| $Na_2WO_4$ | 5 |
| $ZnCl_2$ | 50 |
| $H_3BO_3$ | 25 |
| EDTA, di Na Salt | 500 |

The culture medium is inoculated with an actively growing culture of the bacteria in the exponential growth phase with a bacterial population of about $10^4$ to $10^6$ bacteria/ml. While the amount of inoculum is not particularly critical, normally the amount ranges from 0.1% to 5% of the total liquid volume of suspended catalyst particles. Considerably less inoculum can be used or the inoculum can contain a lower concentration of cells. However, this will result in a longer treatment period. A practical lower limit on the amount of inoculum is therefore about 0.01% w/v bacterial culture.

The carbon compound for use in the culture medium not only acts as a carbon and energy source for the bacteria, but it can also be selected to act as a chelator of divalent cationic metal ions. In addition, it has been unexpectedly discovered that the relative level of release of various metals from the catalyst by the denitrifying bacteria according to the present invention is related to the carbon source that is supplied to the bacteria. For example, Table shows the amount of nickel and molybdenum released when a used coal liquefaction catalyst is crushed to 10 mesh, washed with tetrahydrofuran and contacted with denitrifying bacteria according to the invention. The absolute value of the amount of each metal released, as well as the relationship between the amount of nickel released as compared to the amount of molybdenum released, varies depending on the carbon source. Appropriate selection of carbon source can be used to affect the selectivity of the catalyst treatment. Table 1 also shows that a chelator facilitates that release of nickel from the catalyst, but does not affect the release of molybdenum.

TABLE 1

Release of Mo and Ni from THF-Washed Spent Coal Liquefaction Catalyst by Denitrifying Bacteria

| Catalyst Sample | C Source | Initial g Mo | mg Ni | Released mg Mo | mg Ni | % Released Mo | Ni |
|---|---|---|---|---|---|---|---|
| THF-Washed | Succinate | 1.00 | 207 | 545 | 13 | 88 | 71 |
| THF-Washed | Lactate | 1.04 | 215 | 702 | 29 | 88 | 77 |
| THF-Washed | Lactate-EDTA | 1.27 | 262 | 791 | 200 | 92 | 89 |
| THF-Washed | Adipate | .95 | 197 | 639 | 18 | 88 | 66 |
| THF-Washed | Malonate | .99 | 204 | 789 | 78 | 97 | 76 |
| THF-Washed | Citrate | .98 | 202 | 789 | 96 | 96 | 78 |
| THF-Washed | Oxalate* | .98 | 203 | 518 | 83 | 68 | 51 |
| THF-Washed | EDTA | 1.00 | 205 | 502 | 126 | 56 | 62 |
| THF-Washed | none | 1.01 | 205 | 422 | 11 | 62 | 55 |

Figure 2:
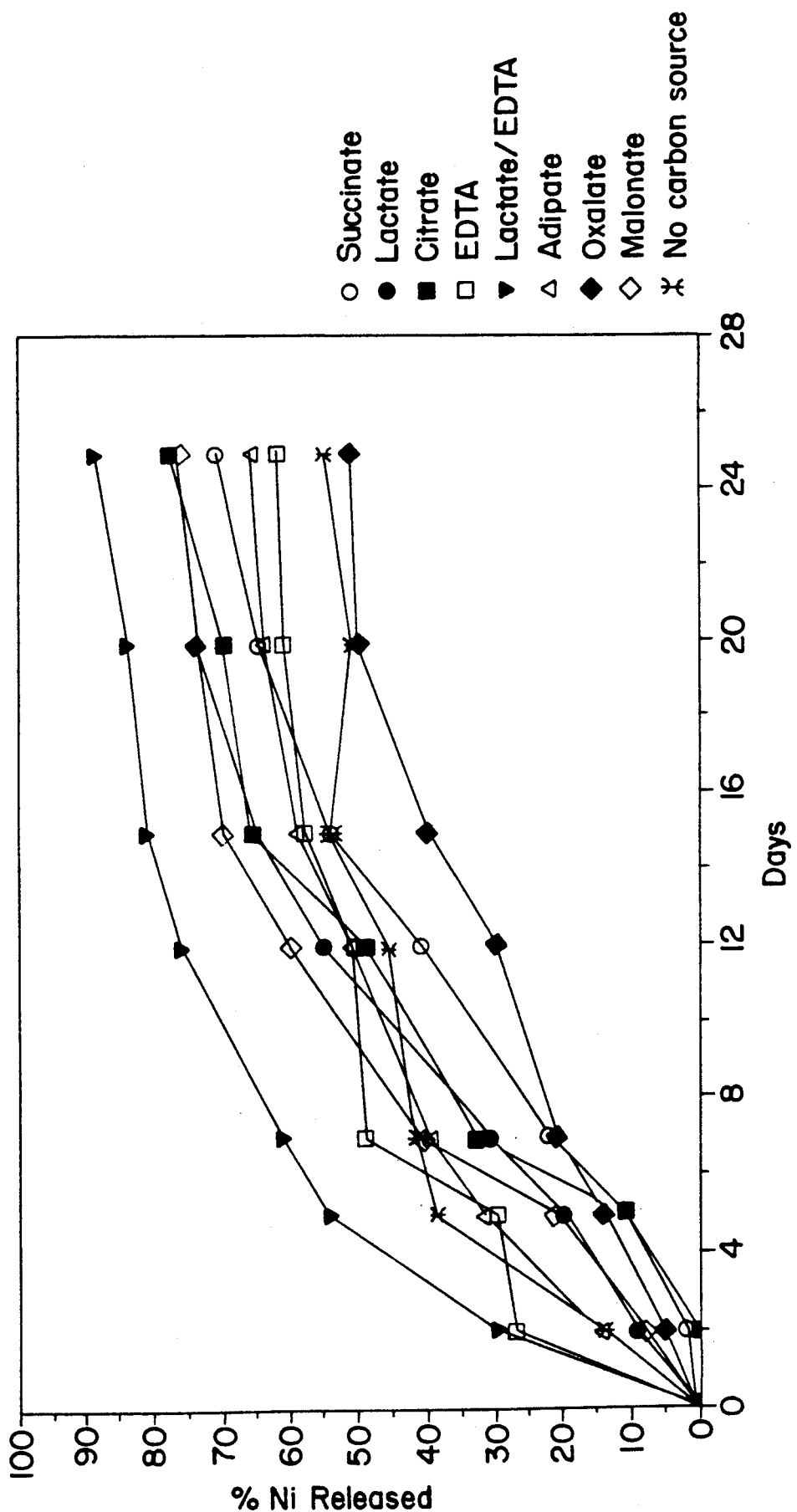
FIG. 2 is a plot of the percentage of nickel released by a solution of denitrifying bacteria according to the present invention as a function of time. The effect of the carbon source present in the growth medium for the denitrifying bacteria on the release of nickel is shown.

FIGS. 1 and 2 are plots of the percentage of molybdenum and nickel released by a solution of denitrifying bacteria according to the present invention as a function of time, and show the effect of the carbon source present in the growth medium for the denitrifying bacteria on the release of the metals.

When the bacteria are used to treat a catalyst that does not include significant amounts of sulfur contamination, the culture medium used during treatment must supply a source of sulfur for the bacteria. But, if the catalyst is contaminated with a significant amount of sulfur contamination, for example, if it is a catalyst that has been used to treat coal or high-sulfur crude oil, it is most effective if the growth medium is sulfur-free. While not wishing to limit their invention by reference to any particular mechanism, the present inventors hypothesize that one mode of action of these bacteria involves a scavenging by the bacteria of sulfur from metal sulfides which contaminate the catalyst, thereby releasing the associated metal in a soluble form that is readily recoverable. In an environment that is sulfur-free except for the sulfides contaminating the catalysts, only those bacteria that can obtain inorganic sulfides from the catalyst as a source of sulfur will grow. The process according to the present invention thus is particularly effective in the treatment of spent catalysts containing both metal and sulfur contamination.

Evidence that the basic mechanism by which the denitrifying bacteria achieve metal release is fundamentally different than that of bacteria previously identified for use in treatment of ores and in catalyst regeneration is found in the pH of the treatment solution. For example, the pH of a solution of *Thiobacillus ferrooxidans* drops during treatment. This microorganism is a strong acid producer, and the acid which it evolves solubilizes the metal so that it goes into solution. Processes for catalyst treatment using these bacteria operate at a pH of about 1.5 to 3.

By contrast, a process for catalyst treatment which employs denitrifying bacteria according to the present invention operates at a pH of about 6.5 to 7.5. The pH does not drop during treatment pursuant to the present invention; in fact, it may even rise slightly, typically by about 0.3 to 0.4 pH units.

As an organism for the treatment of catalysts, heterotrophic, denitrifying bacteria possess several advantages as compared to bacteria previously identified for use in catalyst treatment. The former have superior growth characteristics, and the products of their metabolism are carbon dioxide, nitrogen and water, all of which are environmentally innocuous. Because they are anaerobic, denitrifying bacteria enable treatment with simple leaching piles which can be operated without the constraints imposed by aerobic organisms. This is a fundamental difference between the dentrifying bacteria and the species of bacteria previously used in processes for catalyst treatment.

Figure 3:
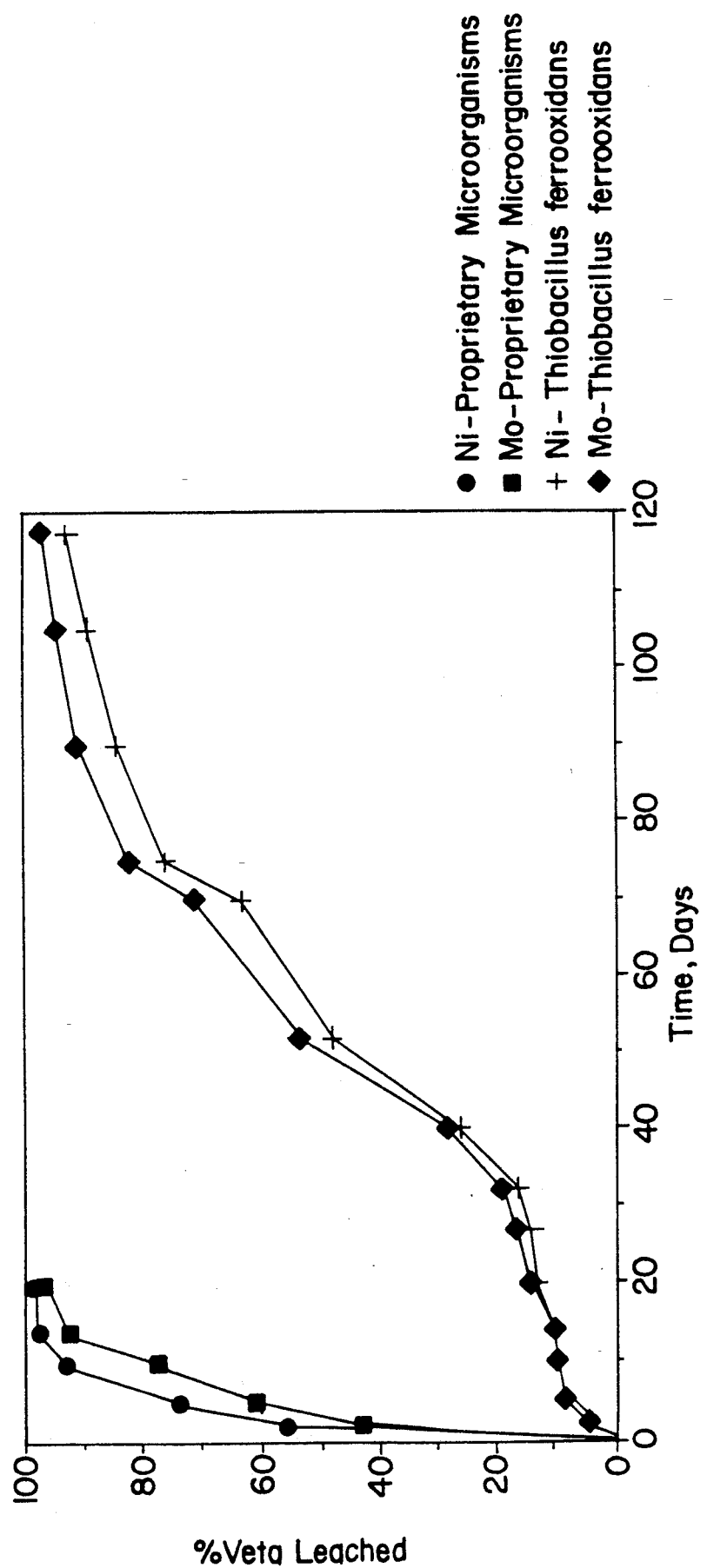
FIG. 3 is plot of the amount of nickel and molybdenum released by solutions of denitrifying bacteria according to the present invention and solutions of *Thiobacillus ferrooxidans* as a function of time.

FIG. 3 is a graph of the amount of nickel and molybdenum released by solutions of denitrifying bacteria according to the present invention and solutions of *Thiobacillus ferrooxidans* as a function of time. The denitrifying bacteria release close to 100% of the nickel and molybdenum within twenty days, while the *Thiobacillus ferrooxidans* bacteria required 120 days to release comparable amounts of nickel and molybdenum.

Quite importantly, the heterotrophic, denitrifying bacteria of the present invention have a naturally high resistance to molybdate, tungstate, and nickel. They also have excellent resistance to the toxic effects of process liquids such as coal liquids, which are very toxic to Thiobacillus. Because of the high tolerance of the bacteria to the metals and process liquids, the amount of liquid required by the process can be decreased ten-fold vis-a-vis processes using *T. ferrooxidans*. At the same time, the denitrifying bacteria release metals at a more rapid rate, at least ten times faster than *T ferrooxidans* without an associated acid production.

Catalyst treatment pursuant to the present invention can be used to recover metals associated with a catalyst. These metals may have contaminated the catalyst during use, or they may be part of the catalyst. If a catalyst in which metal is a constituent is treated according to the present invention, the treatment will generally render the treated catalyst inactive. In this case, the catalyst is discarded. The metals may then either be disposed of or recycled for further use.

If the metals associated with the catalyst are of commercial value, as is the case for molybdenum, cobalt and tungsten, for example, the metal can be isolated and reused. Even if the metal is of little commercial value, recovery may be desirable in view of environmental considerations. For example, nickel is toxic and on the EPA list of materials limited to disposal in toxic waste sites.

Catalyst treatment also can be employed to regenerate catalyst for reuse. If the process only removes metals that are not an active part of the catalyst, i.e., contaminating metals, the catalyst may be reactivated. The process according to the invention can be used to restore the activity of a catalyst to its original level, i.e., to the level that the catalyst had before use and concomitant contamination.

The catalysts which can be treated via a method within the present invention include any catalyst containing metals as a part of the catalyst or as contamination. These include, but are not limited to, catalysts used in the treatment of coal liquids and in hydrocarbon refining processes, as well as catalysts used in other chemical processes, e.g., any hydrogenation reaction. Examples of catalysts include those in which cobalt-molybdenum, nickel-molybdenum, cobalt-tungsten, or cobalt-tungsten-molybdenum is supported on a silica and/or alumina base. These are common hydrogenation catalysts and are often used in processes such as coal liquefaction and the upgrading of heavy oils and residuum. A specific example of such catalysts is Shell 324.

Other catalysts amenable to treatment according to the present invention include the fluidized catalytic cracking (FCC) catalysts used in oil refining. These catalysts are predominantly zeolite-containing catalysts and do not contain metal as an active component. They are typically poisoned during use, however, by deposition of nickel and vanadium from the oil. Both of these contaminants affect the cracking reaction; the vanadium totally interferes with the reaction, while the nickel results in increased production of hydrogen during cracking. An additional contaminant is antimony which is purposefully added to minimize the increased production of hydrogen caused by the nickel contamination. Antimony is highly toxic and its removal from catalysts before they are discarded is highly desired from an environmental standpoint.

For the most efficient release and recovery of metal from the catalysts, any contaminating organic material on the catalyst should first be removed by treatment with an organic solvent or water. Suitable organic solvents include methanol, hexane, toluene ethyl acetate, acetone, chloroform, carbon tetrachloride, methylene chloride, acetic acid, formic acid, tetrahydrofuran, pyridine, isopropanol, acetonitrile, p-dioxane, xylene and t-butanol.

In a preferred embodiment, the catalyst is extensively washed with the water or organic solvent in a soxhlet extractor. The organic solvent is evaporated from the residual catalyst and the oil/organic solvent-containing liquid. The washed catalyst is then treated microbiologically.

The relative efficacy of the various solvents for pretreatment of catalyst contaminated by use during a coal liquefaction process is shown in Table 2. The table shows the percentage of metal released after treatment with denitrifying bacteria for fifteen days, i.e., a value of 97 indicates that 97% of the respective metal has been released. The table shows that the preferred solvent is pyridine when total recovery of nickel and molybdenum is considered. The table also shows that each solvent has a different relative selectivity for nickel and molybdenum. In other words, pyridine removes more than twice as much molybdenum as nickel, whereas water removes over twice as much nickel as molybdenum. This fact can be used to advantage in devising a selective process for metal release.

TABLE 2

| Relative Efficacy of Solvents for Pretreatment of Catalysts (Catalysts used in Coal Liquefaction) | | | |
|---|---|---|---|
| | Relative Efficacy (100 = best) | | |
| Solvent | Ni | Mo | Ni + MO |
| Tetrahydrofuran, 100 mesh | 97 | 99 | 98 |
| Pyridine | 29 | 63 | 46 |
| Dioxane | 32 | 44 | 38 |
| Acetic Acid | 28 | 45 | 37 |
| Toluene | 24 | 42 | 33 |
| iso-Propanol | 25 | 37 | 31 |
| Formic Acid | 29 | 31 | 30 |
| Methanol | 15 | 38 | 27 |

TABLE 2-continued

Relative Efficacy of Solvents for
Pretreatment of Catalysts
(Catalysts used in Coal Liquefaction)

| Solvent | Relative Efficacy (100 = best) | | |
|---|---|---|---|
| | Ni | Mo | Ni + MO |
| Tetrahydrofuran | 14 | 39 | 27 |
| Acetone | 15 | 38 | 27 |
| Chloroform | 15 | 37 | 26 |
| Ethyl Acetate | 13 | 38 | 26 |
| Methylene Chloride | 12 | 38 | 25 |
| Hexane | 14 | 33 | 24 |
| Xylenes | 11 | 36 | 24 |
| Carbon Tetrachloride | 22 | 21 | 22 |
| Water | 24 | 11 | 18 |

If the object of the catalyst treatment is metal release only, and regeneration of the catalyst is not a factor, the catalyst is preferably crushed before treatment with the bacteria. This step increases release and recovery rates. For example, Table 2 shows results for treatment with tetrahydrofuran for both crushed catalyst ("tetrahydrofuran, 100 mesh") and uncrushed catalyst ("tetrahydrofuran").

The catalyst can be crushed either before or after the washing step in a ball mill or electric grinding machine. Given the typically brittle nature of catalysts, crushing of the catalyst is easily performed.

A simple leach pile may be used to contact the catalyst with a solution of the bacteria. A classical problem with the use of leach piles is delivering adequate oxygen into the middle of the pile. This is not a problem with the denitrifiers, since they are anaerobes. According to the present invention, all that is necessary is a means to contain the catalyst and flood it with a culture solution containing the bacteria and necessary nutrients. The organisms will remove the oxygen and begin to produce nitrogen gas while solubilizing the metals.

The pH during leaching is between about 6.5 and 7.5, preferably about 6.8. The pH typically rises during the process by about 0.3 to 0.4 pH units. The temperature during leaching is conducted at a temperature sufficient to maintain bacterial activity, about 15° to 65° C., preferably about 20° to 45° C. The leaching process typically lasts about 10 to 30 days, preferably about 12 to 25 days. The volume of process liquid required to process one gram of catalyst can be reduced to less than 15 ml through suitable selection of solvent and carbon/energy source.

The liquid is collected at the bottom of the pile and treated to remove the metal, which is in a form that is readily recoverable. The nickel is typically in the form $Ni^{++}$ and the Mo is in the form of $MoO_4^{--}$. The metal can be recovered by methodologies well known in the art, such as ion exchange, classical selective precipitation, electrochemical processes and other known methods of recovering metals from solution. The ion exchange properties of leached metals is shown in Table 3.

TABLE 3

Ion Exchange Properties of Leached Metals

| Sample | Total ppm Ni | Total ppm Mo |
|---|---|---|
| Leachate | 1280 | 2300 |
| Material not absorbed to Chelex + column washings | 63 | 2410 |
| Chelex eluate | 1120 | <10 |
| Material not absorbed to Dowex* + column washings | 35 | 120 |
| Dowex* eluate | <5 | 2050 |

*Dowex 1-X-2 anionic exchange resin

EXAMPLE

Medium 337 of Hirsch and Conti is inoculated with a mixed culture of dentrifying bacteria in the exponential growth phase with a bacterial population of $10^4$ bacteria/ml. The amount of inoculum is about 1% of the total liquid volume of suspended catalyst to be treated. The carbon source is citrate.

Shell 324 catalyst used in a process for coal liquefaction is crushed in a ball mill to 100 mesh and washed with tetrahydrofuran in a soxhlet extractor. The solvent is evaporated from the residual catalyst and the oil/organic solvent-containing liquid. A leach pile containing the washed catalyst is then treated with an aqueous solution of the denitrifying bacteria. An amount of one gram of catalyst per 12 ml of solution is treated.

After leaching for 15 days, the catalyst is separated by filtration. Analysis shows that 97% of the nickel and 99% of the molybdenum has been removed.

What is claimed is:

1. A method for regenerating a catalyst, comprising the step of treating a catalyst containing contaminating metals with a solution containing heterotrophic, denitrifying bacteria to remove said contaminating metals and wherein the activity level of the catalyst is restored.

2. The method as claimed in claim 1, wherein said solution containing heterotrophic, denitrifying bacteria further comprises nutrient carbon compounds as a source of carbon and energy.

3. The method as claimed in claim 2, wherein said carbon compounds are selected from one or more of succinate, lactate, adipate, malonate, citrate and oxalate.

4. A method as claimed in claim 1, wherein the step of treating the catalyst with a solution containing heterotrophic, denitrifying bacteria occurs in an anaerobic environment.

5. A method as claimed in claim 1, wherein the anaerobic environment is a leach pile.

6. A method as claimed in claim 1, wherein the pH during the step of treating the catalyst with a solution containing heterotrophic, denitrifying bacteria is between about 6.5 and 7.5.

7. A method as claimed in claim 1, additionally comprising a step of washing the catalyst with an organic solvent before the catalyst is treated with the solution containing the heterotrophic, denitrifying bacteria.

8. A method as claimed in claim 7, wherein the solvent is pyridine.

9. A method as claimed in claim 1, wherein the solution containing the heterotrophic, denitrifying bacteria is a sulfur-free culture medium.

10. The method as claimed in claim 1, wherein said catalyst is a zeolite-containing catalyst, and said contaminating metal is selected from the group consisting of one or more of nickel, vanadium, antimony and arsenic.

* * * * *

UNITED STATES PATENT AND TRADEMARK OFFICE
CERTIFICATE OF CORRECTION

PATENT NO. : 5,250,483
DATED : October 5, 1993
INVENTOR(S) : George T. SPERL et al.

It is certified that error appears in the above-indentified patent and that said Letters Patent is hereby corrected as shown below:

Column 1, line 4, insert the following information:

--This invention was made with Government support under Contract No. DE-AC22-89PC89881 awarded by the Department of Energy. The Government has certain rights in this invention.--.

Signed and Sealed this

First Day of October, 1996

Attest:

BRUCE LEHMAN

Attesting Officer

Commissioner of Patents and Trademarks